United States Patent
Read et al.

(10) Patent No.: US 9,091,860 B2
(45) Date of Patent: Jul. 28, 2015

(54) SPATIALLY MODIFYING POLARIZATION STATE OF LIGHT

(75) Inventors: Steven Charles Read, Mississauga, CA (US); John William Bowron, Oakville, CA (US)

(73) Assignee: IMAX Corporation, Mississauga, ON (*) Notice: Subject to any disclaimer, the term of this patent is extended or adjusted under 35 U.S.C. 154(b) by 78 days.

(21) Appl. No.: 13/805,044

(22) PCT Filed: Jun. 29, 2011

(86) PCT No.: PCT/IB2011/001521
§ 371 (c)(1), (2), (4) Date: Dec. 18, 2012

(87) PCT Pub. No.: WO2012/001495
PCT Pub. Date: Jan. 5, 2012

(65) Prior Publication Data
US 2013/0088688 A1    Apr. 11, 2013

Related U.S. Application Data

(60) Provisional application No. 61/359,647, filed on Jun. 29, 2010.

(51) Int. Cl.
*G03B 21/14* (2006.01)
*G02B 27/26* (2006.01)
(Continued)

(52) U.S. Cl.
CPC .............. *G02B 27/26* (2013.01); *G02B 27/286* (2013.01); *G03B 21/14* (2013.01); *H04N 9/3167* (2013.01);
(Continued)

(58) Field of Classification Search
CPC .......... H04N 13/0434; H04N 13/0438; H04N 13/0459; H04N 9/3167; H04N 9/3197
USPC ............. 353/8, 20, 30, 31, 37, 38, 84, 94, 98, 353/122; 359/498, 502, 490, 634; 349/5–9, 349/18, 97; 348/742–747
See application file for complete search history.

(56) References Cited

U.S. PATENT DOCUMENTS 5,986,815 A * 11/1999 Bryars .......................... 359/634
6,252,712 B1   6/2001 Fürter et al.
(Continued)

FOREIGN PATENT DOCUMENTS

CN    102971659    3/2013
JP    2003337301   11/2003
(Continued)

OTHER PUBLICATIONS
International Patent Application No. PCT/IB2011/001521, International Search Report and Written Opinion, mailed Dec. 12, 2011; 8 pages.
(Continued)

*Primary Examiner* — Sultan Chowdhury
(74) *Attorney, Agent, or Firm* — Kilpatrick Townsend & Stockton LLP (57) ABSTRACT

Systems and methods configured for outputting light having a polarization state distribution that is spatially uniform by applying a correction to, for example, a beam of light with a spatially uniform polarization state distribution that has been altered (unintentionally or otherwise) to become spatially non-uniform are described. A projection system can include an optical element and a polarization-altering device (PAD). The optical element can cause a polarization of light in the projection system to be spatially non-uniform. The PAD can change the polarization state distribution of the light spatially based on an amount of spatial non-uniformity on the light caused by the optical element and before the light enters the optical element. The projection system can output the light having a spatially uniform polarization state distribution.

30 Claims, 9 Drawing Sheets

(51) Int. Cl.
*H04N 9/31* (2006.01)
*H04N 13/04* (2006.01)
*G02B 27/28* (2006.01)

(52) U.S. Cl.
CPC ......... *H04N 9/3197* (2013.01); *H04N 13/0434* (2013.01); *H04N 13/0438* (2013.01); *H04N 13/0459* (2013.01)

(56) References Cited

U.S. PATENT DOCUMENTS

| | | | |
|---|---|---|---|
| 6,547,396 B1* | 4/2003 | Svardal et al. | 353/8 |
| 7,239,446 B2 | 7/2007 | Kreuzer | |
| 7,959,296 B2* | 6/2011 | Cowan et al. | 353/20 |
| 8,023,052 B1* | 9/2011 | Osterman et al. | 349/15 |
| 8,403,488 B2* | 3/2013 | Schuck et al. | 353/7 |
| 2001/0000971 A1* | 5/2001 | Johnson et al. | 349/117 |
| 2006/0139532 A1* | 6/2006 | Berman | 349/117 |
| 2007/0183017 A1 | 8/2007 | Hembd | |
| 2007/0253053 A1* | 11/2007 | Suzuki et al. | 359/239 |
| 2008/0259012 A1* | 10/2008 | Fergason | 345/89 |
| 2010/0289969 A1* | 11/2010 | Yamazaki et al. | 348/744 |
| 2011/0032483 A1* | 2/2011 | Hruska et al. | 353/8 |

FOREIGN PATENT DOCUMENTS

| | | |
|---|---|---|
| JP | 2004286937 | 10/2004 |
| JP | 2005275346 | 10/2005 |
| JP | 2005345864 | 12/2005 |
| JP | 2006030761 | 2/2006 |
| JP | 2006267868 | 10/2006 |
| JP | 2009044295 | 2/2009 |
| JP | 2010122589 | 6/2010 |
| WO | 2008048494 | 4/2008 |
| WO | 2012001495 | 1/2012 |
| WO | 2012001495 | 6/2012 |

OTHER PUBLICATIONS

Chinese Application No. 201180032715.X, Office Action mailed on Oct. 24, 2014, 14 pages (containing 6 pages of the English translation and 8 pages of the original document).

Japanese Patent Application No. 2013-517571, Office Action mailed May 11, 2015, 6 pages (No English translation available).

English translation of Office Action mailed May 11, 2015 for Japanese Patent Application No. 2013-517571, 5 pages.

* cited by examiner

SPATIALLY MODIFYING POLARIZATION STATE OF LIGHT

CROSS-REFERENCE TO RELATED APPLICATIONS

This application is a U.S. national phase patent application under 35 U.S.C. 371 of International Patent Application No. PCT/IB2011/001521entitled "Spatially Modifying Polarized State of Light,"filed Jun. 29,2011, which claims benefit of priority under PCT Article 8of U.S. Provisional Application No. 60/359,647 filed Jun. 29,2010. Both applications are incorporated herein by reference in their entirety.

FIELD

This disclosure relates generally to processing light for display and more particularly (although not necessarily exclusively) to systems and methods for spatially modifying a polarization state of light.

BACKGROUND

Polarization can be used to encode images for stereoscopic three-dimensional (3D) displays. Left and right eye images are encoded with orthogonal polarization states, which match the transmissive states of left and right polarized lens eyewear worn by viewers. Since the polarization states are orthogonal, the leakage of the left/right images into the wrong eye can be minimized.

A disadvantage of the polarization method is that a minimum of 50% of light may be lost when a polarizer is used in the path of unpolarized light. A polarized light source, or an efficient conversion of the unpolarized light into polarized light, can be used to eliminate this loss. This can be effective for displays with modulators designed to process polarized light. For displays using modulators that were not designed to process polarized light, however, this may not work because the polarization state is not maintained through the system. Light in display systems using modulators that are not designed to process polarized light is polarized after the light has been modulated; however, less than 50% of the image light is used.

One successful display system that can be used with unpolarized light includes a digital micromirror device (DMD) provided by Texas Instruments Inc. of Dallas, Tex. There are a number of reasons why it has not been possible to improve the efficiency of a 3D stereoscopic display using DMDs by polarizing light before the DMD. Stress birefringence in the DMD window may alter the polarization state of the light. Furthermore, the stress varies across the window. Thus, the polarization can change non-uniformly across the active area of the DMD modulator. When the light polarization state has changed to become spatially non-uniform, light output may be reduced and light distribution across the display may be changed, both of which are undesirable. Additional complications arise for systems that employ multiple DMDs since the birefringence may not be the same from one DMD window to another. Additionally, the color prism used to split the light to the DMDs may exhibit a wavelength dependent polarization change.

One approach to recover the unused portion of image light that has been polarized after the DMD splits imaged light into two orthogonally polarized paths of imaged light. One path of polarized imaged light is directed to the screen and the other path of polarized imaged light is passed through a retarder and then reflected towards the screen to be superimposed on the imaged light from the first path on the screen. The retarder changes the polarization state of the imaged light in the second path to match the polarization state of the light in the first path so that all of the imaged light from the DMD is utilized. For this technique to be successful, imaged light from the second path is aligned with the imaged light from the first path on the screen. Any optical magnification, optical offset, or optical keystone effect that is different between the first and second imaged light path can result in a misalignment in the superimposed images on the screen and in a less than optimum presentation.

Accordingly, there remains a need for systems and methods that can allow a DMD-based display to operate with polarized light and to "repair" changes to the state of polarization.

SUMMARY

In one aspect, an optical system is provided. The optical system can include an optical element and a polarization-altering optical device (PAD). The optical element can cause a polarization of light in the optical system to change from a predetermined polarization state distribution. The PAD can change the polarization state distribution of the light spatially based on an amount of change to the polarization state distribution caused by the optical element. The optical system can output the light having the predetermined polarization state distribution.

In another aspect, a projection system is provided. The projection system can include a light source, a PAD, a spatial light modulator (SLM) device, a projection lens and a cleanup polarizer. The light source can provide light. The PAD can change a polarization state distribution of the light spatially. The SLM can cause the polarization state distribution of the light to change from a predetermined polarization state distribution. The cleanup polarizer is positioned between the projection lens and a screen. The projection lens can receive light having the predetermined polarization state distribution that has been changed by the PAD. The cleanup polarizer can receive the light from the projection lens and allow a maximum amount of polarized light to be outputted from the projection system.

In another aspect, a method is provided. Polarized light is received. A polarization state distribution of the polarized light is changed by an optical element from a predetermined polarization state distribution. The polarization state distribution of the polarized light is changed spatially by a PAD based on an amount of change to the polarization state distribution of the polarized light caused by the optical element to cause to the polarized light to have the predetermined polarization state distribution. The polarized light having the predetermined polarization state distribution is outputted.

In another aspect, a method is provided. A screen light brightness value corresponding to a retardation value of a PAD pixel pair is received. In response to determining that an insufficient number of screen light brightness values are received, changing the retardation pair value for the PAD pixel pair and receiving an additional screen light brightness value corresponding to the changed retardation pair value of the PAD pixel pair. In response to determining that a sufficient number of screen light brightness values are received, determining a set of parameters using the screen light brightness value and retardation pair value. The set of parameters are stored in memory.

In another aspect, a method is provided. A screen light brightness value corresponding to a PAD pixel pair is received. In response to determining that at least one of a maximum or a minimum screen light brightness level is not reached, changing PAD retardation pair values for the PAD pixel pair and receive an additional screen brightness value corresponding to the PAD pixel pair. In response to determining that at least one of the maximum or the minimum screen light brightness level is reached, storing retardation pair values that correspond to the at least one of the maximum or the minimum screen light brightness level for the PAD pixel pair.

These illustrative aspects are mentioned not to limit or define the disclosure, but to provide examples to aid understanding thereof. Additional aspects and features are discussed in the Detailed Description, and further description is provided there. Advantages offered by one or more of the various aspects and features may be further understood by examining this specification or by practicing one or more aspects and features presented.

DETAILED DESCRIPTION

Certain features of the present disclosure relate to a system configured for outputting light having a predetermined polarization state distribution by applying a correction to, for example, a beam of light that has had the polarization state distribution altered (unintentionally or otherwise) from the predetermined polarization state distribution. A predetermined polarization state distribution may be a polarization state distribution, such as a uniform polarization state distribution, required for proper display. For example, the system can output light having a polarization state that has an intended uniform polarization state distribution by applying a correction to light in which the polarization state distribution is unintentionally or otherwise altered to have a non-uniform polarization state distribution. A polarization state can be a single polarization state that represents the average polarization state of light in a pixel area. The polarization state can be different from one pixel area to another. A polarization state distribution can represent the different polarization states of the pixels over an area with multiple pixels.

Figure 1A:
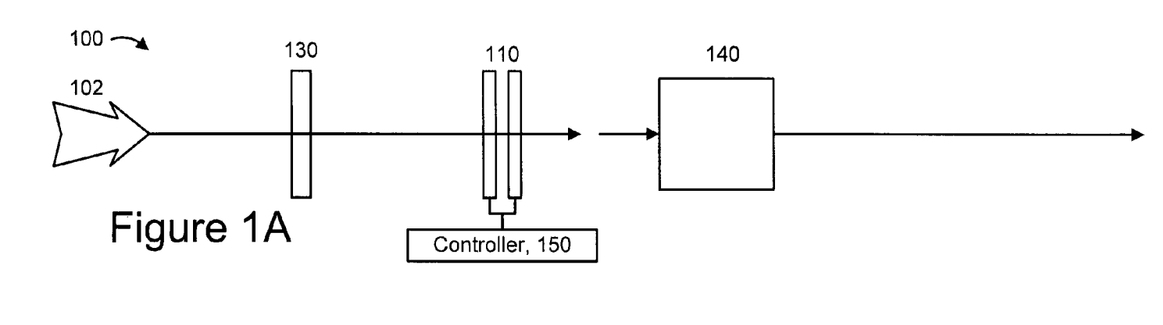
FIG. 1A is a block diagram of a system configuration for outputting light having a polarization state distribution that is spatially uniform according to one feature.
Figure 1B:
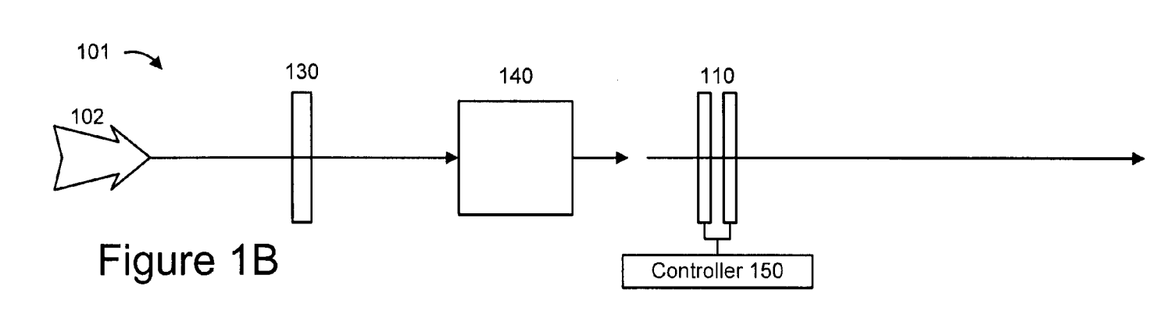
FIG. 1B is a block diagram of an alternative system configuration for outputting light having a polarization state distribution that is spatially uniform according to one feature.
Figure 1C:
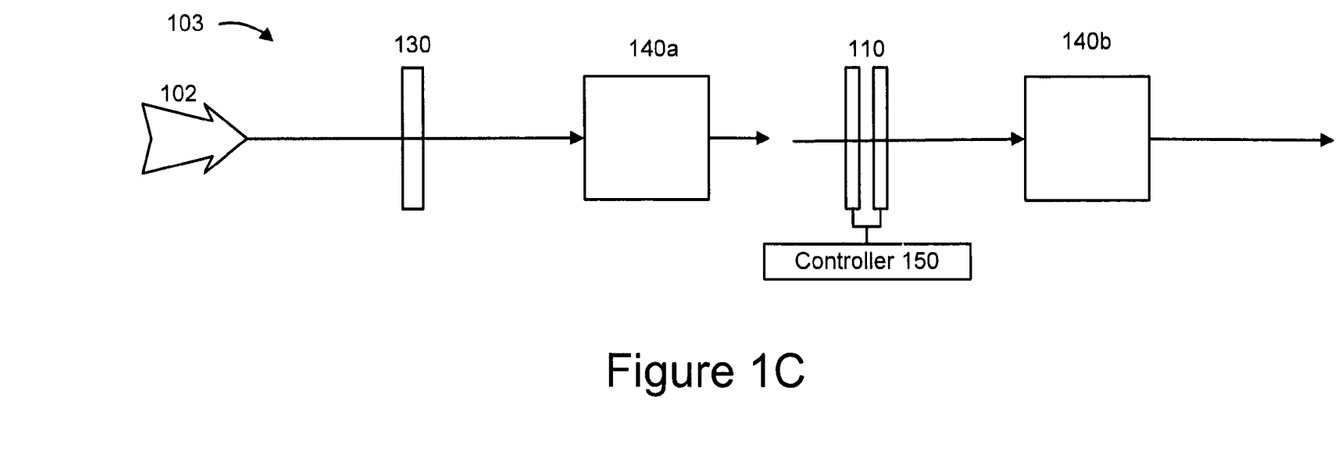
FIG. 1C is a block diagram of a second alternative system configuration for outputting light having a polarization state distribution that is spatially uniform according to one feature.

FIGS. 1A, 1B and 1C depict system configurations 100, 101, 103 according to some aspects. The systems in FIGS. 1A, 1B and 1C can be used to output a light with a uniform polarization state distribution, or light with a polarization state that is spatially uniform. Although certain implementations are described as processing light to a uniform polarization state distribution, implementations according to various aspects can be apply to output any predetermined or desired polarization state distribution profile. The system in FIG. 1A is described first.

The optical system 100 can receive light 102 without a specific state of polarization, which is also known as randomly polarized light. Additional elements (not shown) may be included that can collimate the source light appropriately for downstream optics. The system 100 can also include a light polarizing element 130 that can polarize light to a particular spatially uniform state of polarization. The state of polarization can be linear, circular or elliptical. The system 100 includes an optical element 140, which may be a spatial light modulator (SLM) such as a digital micromirror device (DMD), that can change the polarization state of the light so that the polarization state is no longer spatially uniform. Birefringent material, optical surface coatings, reflective surfaces, direction selective absorption, birefringence induced by stress or by an electric or magnetic field can all cause the polarization state to change spatially and non-uniformly. The system 100 can output the polarized light.

The system 100 includes a polarization-altering optical device (PAD) 110 disposed between the light polarizing element 130 and the optical element 140. The PAD 110 can adjust the state of polarization of light in a varied amount spatially. For example, the PAD 110 can include two spatially addressable, variable retardation plates having a relatively small separation. An example of a spatially addressable retardation plate is a liquid crystal device or cell without any polarizing surfaces. The spatially addressable retardation plates can be addressed electronically. The liquid crystal device can be constructed as a matrix of separately addressable pixels so that the polarization state of light can be controlled by a different amount on a pixel-by-pixel basis. The system 100 also includes a controller 150 that can control the PAD 110 by adjusting the polarization state of light spatially. The controller 150 may be electronic. By adjusting the polarization state of light spatially, the spatially non-uniform polarized state of light caused by optical element 140 can be repaired. The polarization state can be spatially uniform when the system 100 outputs the light. If the optical element 140 changes the polarization state in a fixed manner (i.e. there is a constant phase difference between different portions of a beam passing through optical element 140), then PAD 110 may not need to be positioned at an optical conjugate with respect to optical element 140.

Although FIG. 1A depicts the PAD 110 disposed before the optical element 140 that causes the polarization state of light to become spatially non-uniform, the PAD 110 in other implementations can be disposed after the optical element 140. FIG. 1B depicts an optical system 101 in which PAD 110 is disposed after optical element 140, which causes the polarization state of light to become spatially non-uniform. FIG. 1C depicts an optical system 103 in which optical elements 140a, 140b are disposed on both sides of the PAD 110, respectively. The optical elements 140a, 140b may cause the polarization state of light to become spatially non-uniform.

If the received light 102 is a laser light source in which the light is already polarized, then light polarizing element 130 can be removed in systems 100, 101, and 103.

In systems 100, 101, and 103, the polarized light after light polarizing element 130, in which the global state of polarization or polarization state distribution has changed, is altered to the correct polarization state distribution by the PAD 110.

Figure 2:
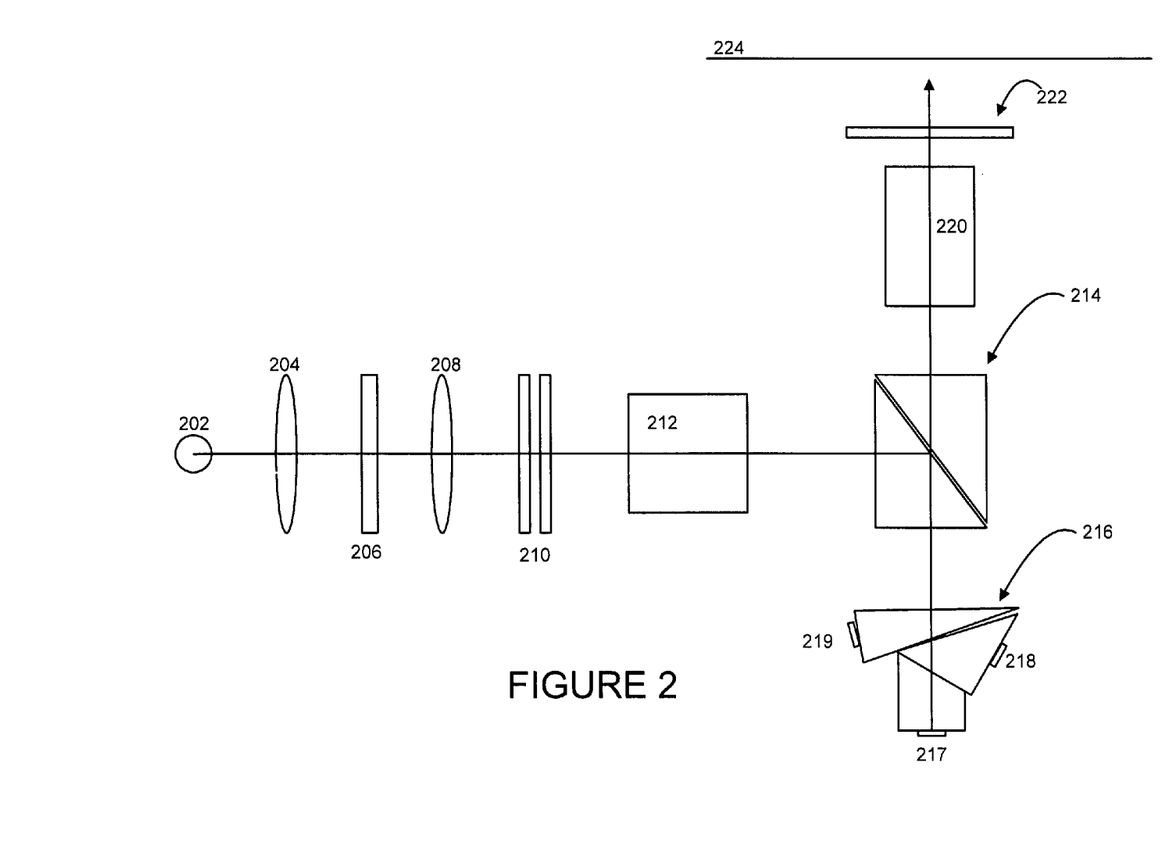
FIG. 2 is a block diagram of a reflective projection system configured for outputting light having a polarization state distribution that is spatially uniform according to one feature.

FIG. 2 depicts additional features according to certain implementations of an optical system that is a reflective projection system configured to achieve a higher efficiency stereoscopic 3D display by compensating for changes in polarization state spatial uniformity.

White light can originate from a polarized light source 202. Examples of polarized light source 202 include a combination of polarized lasers, a lamp with a polarization conversion system, and a white light source split into two separate polarized light channels used to drive two projectors. Light from the polarized light source 202 can pass through an illumination section that includes a set of lenses 204, 208 and lenslet arrays 206 to homogenize the light and obtain the correct aspect ratio to illuminate the spatial light modulator (SLM) devices 217, 218, 219, each of which may be a DMD. The SLM devices 217, 218, 219 can each modulate light to produce imaged light based on input image data. Other illumination types to homogenize the light are possible, such as using an integrator rod instead of lenslet arrays 206. Integrator rods can preserve light polarization if the polarization of the input light is linear and is aligned with an edge of the rod. Integrator rods may be unable to preserve light polarization sufficiently if the input polarization of the light is elliptical, which can be correctable by the PAD 210.

The output of the illumination section can be directed to the PAD 210. The PAD 210 can adjust the state of light polarization spatially according to predefined static or dynamic values. Relay optics 212 (which may not be included in some implementations) image the light from the PAD 210 through a total internal reflection (TIR) prism 214 and a separator/combiner color prism 216 onto respective red, green and blue SLM devices 217, 218, 219. Modulated light from the SLM devices 217, 218, 219 can be recombined into one light beam by the separator/combiner color prism 216 and directed through a projection lens 220 to form an image on a screen 224. The PAD 210 may be conjugate to both the SLM devices 217, 218, 219 and the screen 224 when relay optics 212 are used. The system can include a cleanup polarizer 222 at the output of the projection lens. The cleanup polarizer 222 can eliminate any residual variation in polarization. The transmission through the cleanup polarizer 222 may be high because the programming of the PAD 210 may restore polarization uniformity that was lost by polarization disrupting elements, such as the windows of the SLM devices 217, 218, 219. A second projection system (not shown) can be used to transmit the second eye view with an orthogonal output polarization state, but can otherwise have similar components as those depicted in FIG. 2. For example, a first projection system can project a left eye image in which the image is encoded with a first polarization state and the second projector system can project the right eye image in which the imaged is encoded with a second polarization state that is orthogonal to the first polarization state. In this setup, the two projectors can form the three dimensional projection system.

The PAD 210 according to one implementation can include two spatially addressable retardation plates with a relatively small separation. The spatially addressable retardation plates can create a specific state of polarization that can be controlled spatially over the cross section of the beam of light that passes through the plates. The spatially addressable retardation plates can be located near a conjugate plane to the SLM devices 217, 218, 219 such that the light associated with each pixel on the spatially addressable retardation plates can map to a local area on the SLM devices 217, 218, 219. The retardation values of the PAD 210 can be selected so that when light is altered by the separator/combiner color prism 216, of one or more of the SLM devices 217, 218, 219, or the projection lens 220, or by any other element in the system, the light can be outputted by the projection lens 220 with a desired spatial polarization state. The PAD 210 may not be restricted to correcting the spatial uniformity of the polarization state due to the element at the optical conjugate. The resolution of the PAD 210 can be the same or much lower than the resolution of the SLM devices 217, 218, 219. Increasing the resolution of the PAD 210 can allow increasingly refined corrections to be made to the spatial non-uniformity. In some implementations, the resolution may be configured to be just high enough to follow the polarization state changes induced by the system. Higher resolution can result in unnecessary cost. To eliminate pixel artifacts caused by the PAD 210, or the imaging of surface defects on the PAD 210 to the SLM devices 217, 218, 219, the PAD 210 can be moved slightly away from the conjugate plane to blur the illumination on the SLM devices 217, 218, 219 and to blur the spatial transition between the different polarization regions of the PAD 210.

Figure 3:
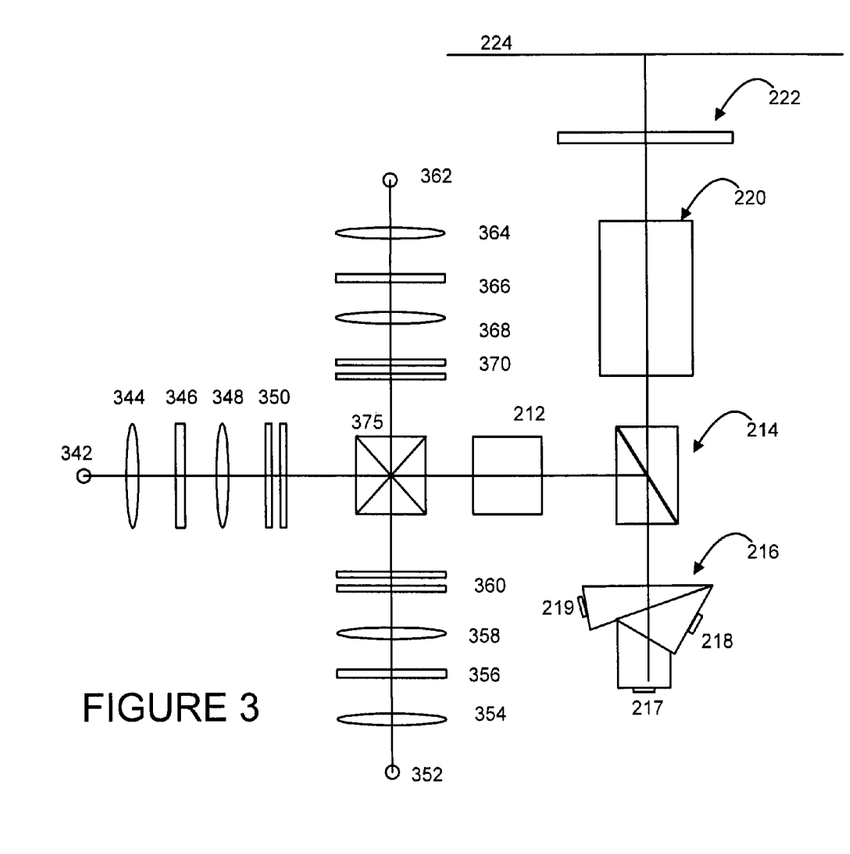
FIG. 3 is a block diagram of a three-color channel system configured for displaying light having a polarization state distribution that is spatially uniform according to one feature.

FIG. 3 depicts an optical system that is a projection system according to some implementations that can account for possible differences in the amount of stress birefringence of three SLM devices 217, 218, 219 such that uniformity of the polarization state for each of the three color channels can be better compensated. For example, the system of FIG. 3 can be used for a polarized light source that has been separated into red, green and blue bands. Three separate light sources 342, 352, 362, such as red, green and blue lasers, can be used to separate the polarized light source. Alternatively, for a polarized white light source, dichroic mirrors can be used to separate the white light into three separate colored light paths of red, green and blue (not shown in FIG. 3). Each color channel can have its own set of lenses, lenslet array, and PAD. For example, the color channel associated with light source 342 can include set of lenses 344, 348, lenset array 346, and PAD 350. The color channel associated with light source 352 can include set of lenses 354, 358, lenset array 356, and PAD 360. The color channel associated with light source 362 can include a set of lenses 364, 368, lenset array 366, and PAD 370.

Each PAD can be programmed to compensate for polarization changes occurring for each color channel. Differences in birefringence of each SLM device can be corrected.

A color combination prism 375 can receive three colored beams and form a single white beam. The white beam can enter the relay optics 212 and other components as discussed with reference to FIG. 2 to become modulated image light that is projected by the projection lens 220 through a cleanup polarizer 222 onto a screen 224. A second projection system (not shown) can be used to transmit the second eye view with an orthogonal output polarization state In another implementation, a single projector 3D system can be used. A polarization switch device (not shown), such as a z-screen, can be positioned between the SLM and the screen 224 to allow the polarization state of the imaged light to change globally (i.e. over the entire image area) as needed for the corresponding left and right eye image for stereographic 3D projection. The cleanup polarizer may be optional, such as if the polarization state incident on the polarization switch device is of sufficient quality In this case, the PAD 210 or PADs 350, 360, 370 can allow higher light efficiency to be achieved than would otherwise be possible. If the PAD(s) can operate at sufficiently high frame rate, then the PAD(s) can perform the same function as the switching device and the switch device can be removed.

Certain implementations of systems according to the present disclosure can be used in 3D cinema feature film presentations having projectors that operate based on DMD technology, where it can be difficult to maintain sufficient light levels. Using PAD(s) as described above is not limited to display systems that use a DMD, but the PAD(s) can correct for any optical systems in which the spatial uniformity of the polarization state of the light has been altered by optical elements or otherwise (e.g. coatings on optical components or reflective surfaces, or polarized light sources that initially may have non-uniform spatial polarization state distribution). Examples of other types of optical systems in which PAD(s) can be used include non-reflective projection systems, such as liquid crystal display, and other reflective systems, such as liquid crystal on silicon.

In another implementation, the presence of the cleanup polarizer 222 can allow the system to change the dynamic range of the system globally while maintaining spatial uniformity of the polarization state of light. For dark scenes, a spatially uniform polarization state of light can be created such that the light outputted by the projection lens 220 in combination with the effect of the cleanup polarizer 222 can produce a minimum amount of polarized light from the cleanup polarizer 222 to the screen 224. In this situation, the PAD(s) can be configured to alter the spatial polarization state of the light so that the altered state of polarization is spatially uniform at the output of the projection lens 220 but is orthogonal to the polarization axis of the cleanup polarizer 222. In a similar manner, the PAD(s) can be programmed to alter the spatial polarization state of the light so that the altered state of polarization is spatially uniform at the output of the projection lens 220 but is at a state of polarization that is between the state of polarization that allows the maximum or the minimum amount of polarized light to pass through the clean up polarizer depending upon scene image brightness.

In another implementation, the PAD 210 in FIG. 2 in combination with a cleanup polarizer 222 can be used to change the dynamic range of the projection system for various regions of the image area, while maintaining the desired distribution of the polarization state of light. For example, the PAD 210 can be near or at a conjugate plane to the SLM devices 217, 218, 219. Computations based on local image scene content can be used to determine the desired amount of transmission between maximum and minimum through the cleanup polarizer 222 for each region of the SLM devices 217, 218, 219 that corresponds to each pair of PAD 210 pixels. These corrections may change both temporally and spatially based on the scene image content.

In another implementation, the PADs 350, 360, 370 as described in FIG. 3, in combination with cleanup polarizer 222, can be used to modify the brightness uniformity of red green and blue and thus modify color uniformity, while maintaining spatial uniformity of the polarization state of light. The PADs 350, 360, 370 can be near or at a conjugate plane to the SLM devices 217, 218, 219. Measurements of color uniformity can be used to determine a correction to produce improved color uniformity. The correction values can be applied to the PADs 350, 360, 370. The correction can be based on internal performance of the projector or it can also include external effects such as environmental lighting influences.

The thermal light load on SLM devices 217,218, 219 may be essentially constant in the system of FIG. 2. Other systems that use serial SLM devices to improve contrast can suffer from problems of thermal drift since the variable light output of the first set of modulators can change the amount of thermal load of the light on the second set of modulators. The varying light load, temporally and/or spatially, on the downstream second set of modulators can result in thermal changes on the modulator optics that cause misregistration of pixels with different colors and unacceptable image degradation. In the system of FIG. 2, the SLM devices 217, 218, 219 may essentially experience the same amount of light, independent of signal content. The cleanup polarizer 222 can receive a variable amount of light load that leads to a variable amount of heating of the cleanup polarizer, but the cleanup polarizer can be readily cooled such that its affects on pixel registration is minimized or eliminated.

In another implementation, the PAD(s) can be used to improve the light efficiency in any type projection system that uses polarized light and has an SLM device that operates using polarization, but has at least one element in the system that causes the spatial polarization state to become non-uniform.

Figure 4:
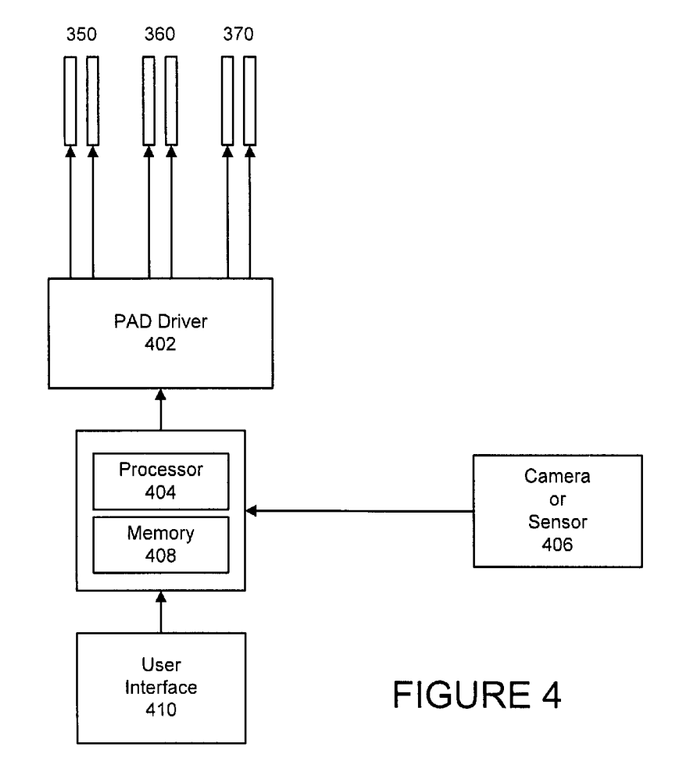
FIG. 4 is a block diagram of a system for controlling a polarization-altering optical device (PAD) usable to adjust light to a polarization state distribution that is spatially uniform according to one feature.

In another implementation, the PAD can be controlled by a controller such that spatial polarization state can be corrected over time. This may be useful when thermal stress in the optical system (or any other mechanism) of the projector changes the non-uniformity of the polarization state of light over time. The correction by the PAD can also change over time to maintain properly the spatial uniformity of polarization state of the light at the output of the projection lens. A control system as shown in FIG. 4 can be used to either calibrate the projection system with the PAD and/or to correct the projection system with the PAD over time either during a projection show or between projection shows. For example, PAD driver values stored in memory can be updated between shows or on a daily or weekly basis.

The PAD control system in FIG. 4 can control the PADs 350, 360, 370 with a PAD driver 402. The PADs 350, 360, 370 may each be two retarder plates in which the retardation value of each pixel can be controlled. The two retardation plates may be in series optically so that the pixel of one retarder plate lines up with a pixel from the other retarder plate. Each pixel from the first plate lines up with the corresponding pixel in the second retarder plate, and these pixels can be a pixel pair. The PAD driver 402 can drive each pixel pair by the amount determined by the value computed by the processor 404 or received by the processor 404 from the user interface 410 and stored in memory 408. By controlling each pixel pair in the retarder cells of a PAD, the polarization state of the light passing through the pixel area can be changed so the light at the output of a projection lens is in a polarization state that is spatially uniform for each color. The table of corrective values to apply to the PAD driver 402 can be predetermined by a calibration process such that the determined corrective values are stored in memory 408 and applied to a PAD as needed. If PAD driver values change over time due to changes in the projection system, the change profile can be determined and the stored PAD values updated. One such change may be a result of the projector reaching a thermal steady state condition from powering up. The PAD value change profiles can also be received from the user interface 410 (or other source) and stored into memory 408.

The PAD(s) may implement a variety of corrections, as well as image enhancing functions. Configuring the PAD(s) can depend on specific corrections and functions selected for implementation, and configuring can be implemented using predefined static values and predefined dynamic values that are corrections. In some implementations, the PAD(s) can be configured dynamically. Examples of predefined static values include color uniformity correction, luminance uniformity correction, and efficiency improvement. Examples of predefined dynamic values include polarization switching, global contrast enhancement and local contrast enhancement. The user interface 410 can be used to receive from a user specified values and functions that are to be used in real time. For each value or function, the processor 404 can determine necessary retardation values based in part on the values determined in the calibration process and stored in memory 408. The resulting retardation values can be provided in real time to the PAD driver 402 to run the PAD(s) accordingly.

The control system of FIG. 4 can be used to calibrate a PAD. Calibration can be used to characterize the polarization change due to the optical system that has been subdivided into spatial regions that correspond to each PAD pixel pair. This information can be stored in a table and used for controlling the amount of PAD retardation. A camera or sensor 406 can retrieve, by frame grabbing or other suitable method, image information that is projected onto a screen. The initial calibration may be a two-stage process. The first stage can include determining the spatial correspondence between the PAD pixels and the corresponding SLM pixel or pixels for each color of the projection system. This information can be used to determine a SLM/PAD correspondence map. The second stage can include determining the degree of retardation for each set of PAD pixels so that the projected light transmission is maximized or minimized through the cleanup polarizer. The calibration can be performed one color at a time. When calibrating for one color, the other color sources can be disabled. For a pair of PAD pixels, a known pair of retardation values can be applied by the PAD to produce a brightness output. The change to the state of polarization caused by the optical system can be determined based on a collection of known information and corresponding measured brightness.

Figure 5:
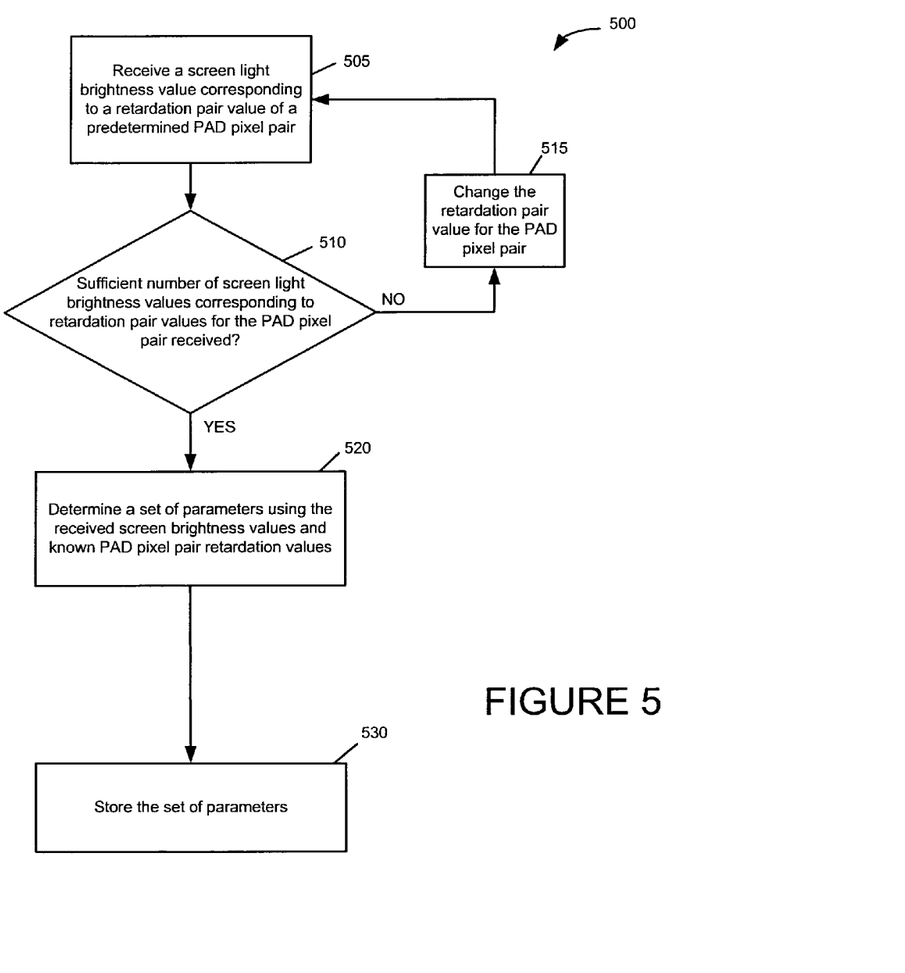
FIG. 5 is a flow diagram of a process for calibrating a control system for a PAD according to one feature.

FIG. 5 depicts one example of a second stage process that can be used to calibrate a PAD control system to determine the degree of retardation for each pair of PAD pixels or region of pixels. The method 500 is described for one predetermined pair of pixels. For the next pair of pixels, the method is repeated until all pairs of pixels on the PAD(s) have been calibrated to produce a table of retardation values.

In block 505, a screen light brightness value corresponding to a known retardation pair value of a predetermined PAD pixel pair is received. For example, the predetermined pixel pair on the PAD can be driven by the PAD driver to produce a known change to polarization state so the light of the predetermined pixel region on an SLM device can be projected by the projection lens through the cleanup polarizer of a known orientation, and onto a screen. A camera can capture a screen brightness value corresponding to a predetermined SLM region and known PAD pixel pair retardation value. A processor can receive the measured value.

In block 510, the processor can execute an application stored in memory to determine if a sufficient number of screen light brightness values corresponding to retardation pair values for the PAD pixel pair are received. This process may be similar to determining an unknown state of polarization using polarizers and wave plates. For example, a minimum number of measurements may be used to determine a unique polarization, but additional measurements can be used to increase accuracy. In some implementations, at least four screen light brightness values corresponding to four different retardation values that have been appropriately chosen for the PAD pixel pair or PAD pixel region are received. If an insufficient number are received, the retardation pair value for the PAD pixel pair is changed in block 515 and the process returns to block 505.

If a sufficient number are received, the processor can execute. the application stored in memory to determine, using the received screen brightness values and known PAD pixel pair retardation values, a set of parameters in block 520. The set of parameters may define a polarization state. The set of parameters can be determined by applying a method such as a Jones matrix using the specific configuration of the input polarization, principle axis of the first retarder, principle axis of the second retarder and the orientation of the clean up polarizer.

In block 530, the processor can cause the set of parameters calculated in block 520 for the PAD pixel pair to be stored in memory. The stored set of parameters may be stored as a table of parameters that can be populated for PAD pixel pairs for the three colors of the projection system.

Figure 6:
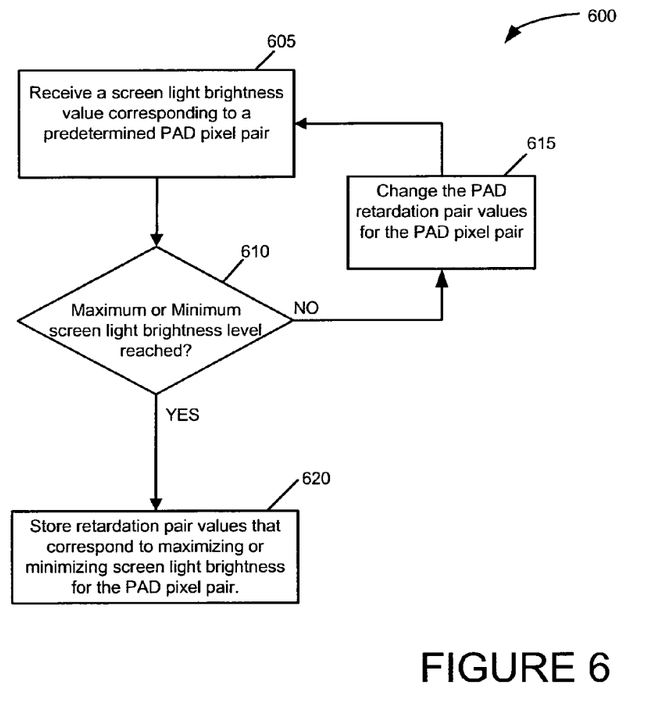
FIG. 6 is a flow diagram of a process for calibrating a control system for a PAD according to a second feature.

FIG. 6 depicts another method that can be used to calibrate the PAD control system to determine the degree of retardation for each pair of PAD pixels. The method 600 is described for one predetermined PAD pixel pair. For the next pair of pixels, the method is repeated until the pairs of pixels on the PAD are calibrated to produce a table of retardation values.

In block 605, a screen light brightness value corresponding to a predetermined PAD pixel pair is received. For example, the predetermined pixel pair on the PAD can be driven by the PAD driver to produce a known amount of polarization state change so the light of the predetermined pixel pair is projected by a projection lens through a cleanup polarizer of a known orientation, and onto a screen. A camera can capture a screen light brightness value corresponding to a predetermined PAD pixel pair. The processor can receive the measured value.

In block 610, the processor executes an application stored in memory to determine if the maximum or minimum screen light brightness level is reached by the screen light brightness value corresponding to the predetermined PAD pixel pair. If the processor executing the application determines that the maximum or minimum level has not been reached, the processor executes the application to change the PAD retardation pair values for the PAD pixel pair in block 615 and the process returns to block 605.

If the processor executing the application determines that the maximum or minimum level has been reached, the processor causes the retardation pair values that correspond to maximizing or minimizing screen light brightness for the PAD pixel pair to be stored memory, in block 620. A retardation table of retardation values can be formulated in memory based on the retardation value pair that produced the screen light brightness to be a maximum or a minimum value. The table of retardation values can be populated for PAD pixel pairs for the three colors of the projection system.

The process of FIG. 6 may be implemented to determine retardation values based on a comparative basis without using a calibrated camera or sensor to make the screen light brightness measurements.

In another implementation, the calibration methods 500 and 600 can be performed with a camera that captures the screen light brightness for PAD pixel pairs at the same moment using a frame-grabbing feature. The data can be processed for PAD pixel pairs in parallel using the same methods as described above for one PAD pixel pair.

Implementations according to certain systems and methods described herein can ensure that polarized light outputted by the projection lens has any desired polarization state distribution for example a spatially uniform polarized state that can pass through a cleanup polarizer with a high efficiency. The following describes one example of an implementation according to one system and process to illustrate a PAD and a cleanup polarizer that can result in outputted light having a spatially uniform polarized state. The discussion begins at a projection lens output for a projection system (e.g. FIG. 3) that uses DMDs, and follows the light back to a light source (or light sources such as in FIG. 3). The example is provided to aid understanding; it should not be used to limit any invention claimed.

A small pencil of white light, outputted from the cleanup polarizer, can converge to a pixel on the theater screen. This light can have a specific polarization since it just emerged from the cleanup polarizer. The light may have substantially the same polarization before it is received by the cleanup polarizer to obtain high efficiency. Following the light in the reverse direction back through the projection system, the light travels through the projection lens where it may change its polarization state slightly. Then, it travels through a TIR prism and color prisms where it is split into red green and blue components that each undergoes further polarization changes. The three pencils of light then converge to three pixels on the respective color DMDs. In traveling to the DMDs, the local stress birefringence of the window further changes the polarization state. This may be different for each of red, green and blue DMDs. The light is reflected from the DMDs and travels back through the DIVED window, color prism (where it is converted back to a white beam), TIR prism and relay optics, undergoing further changes to its polarization state. Finally, the white light is split again by the color prism into three pencils of light that converge to three points near each PAD in the respective RGB channels. The light occupies a small area on the output of each PAD with a specific polarization state. The polarization state in the green channel can be labeled as $P_a$. $P_a$ may be any possible state of polarization. Different portions of the pencil of light may have different polarization states, but $P_a$ may be the resulting sum of the polarization states within the pencil of light. A properly designed green PAD can convert an initial polarization state to the polarization state $P_a$. With the PAD in place and set accordingly, propagating the light forward through the array and through all the optics can yield the desired polarization state incident upon the cleanup polarizer. Similar arguments are applied to the red light going through the red PAD and blue light going through the blue PAD. Provided the resolution of each PAD array is high enough to account for the variation in polarization state across the field of view of the display, the PAD can match the spatial change in the polarization state. The red, green and blue PAD arrays may not have the same resolution.

Figure 8:
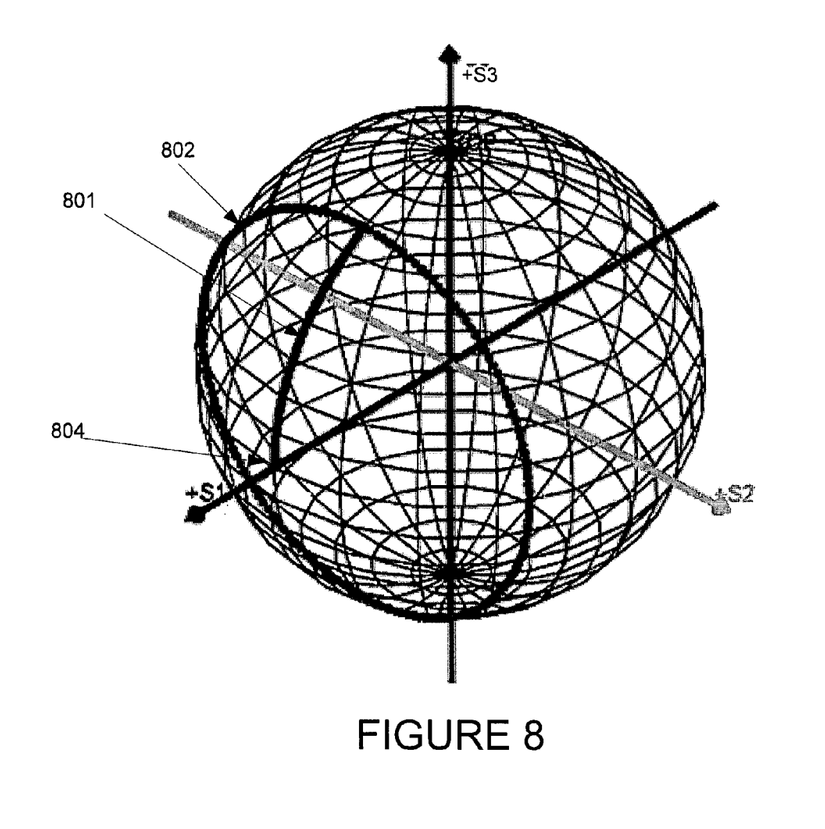
FIG. 8 is a Poincare sphere illustrates how a PAD alters the polarization state distribution of light shown thereon according to one feature.

The Poincare sphere (*Optics of Liquid Crystal Displays*, P. Yeh, C. Gu, 1999, section 2.5) can be used as a visualization tool to show that the PAD according to some implementations can output any polarization state from a given input polarization state. Each point on the Poincare sphere represents a distinct polarization state. The surface of the sphere represents a complete set of all possible polarization states. A specific example is provided below, but the PAD can be designed via a variety of different configurations or methods.

Figure 7:
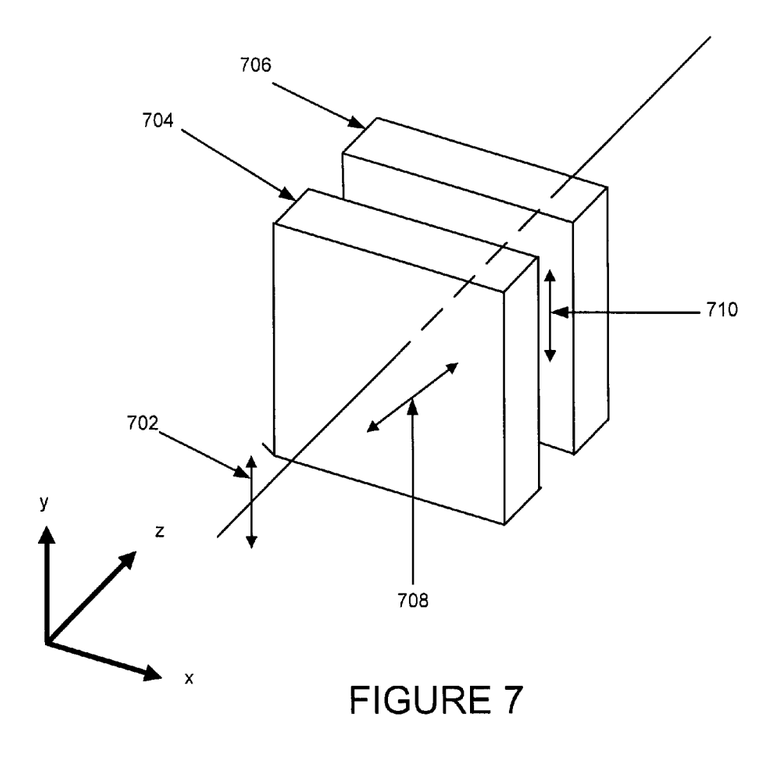
FIG. 7 illustrates light passing through a PAD that includes two retardation plates according to one feature.

In some implementations, the PAD can include two variable retardation plates 704, 706 as shown in FIG. 7 and light propagates in the +Z direction. The light received by the PAD can have linear polarization and have a polarization state aligned along the y-axis 702. The first retardation plate 704 can be positioned with principle axes 708 at forty-five degrees with respect to the y-axis. As shown on the Poincaré sphere in FIG. 8, the input linear polarization along the y-axis is located where the +S1 axis pierces the surface of the sphere 804. The change in polarization state due to the variable retardation on the first retardation plate is a rotation about the principle axis (+S2) of the retardation plate. Segment 801 shows the resulting change in polarization state for a variable retardation ranging from 0 to 60 degrees. The second retardation plate 706 can be positioned with its principle axis 710 along the y-axis. On the Poincare sphere the change in polarization state for the second retardation plate 706 is represented by a rotation about the Si axis and segment 802 shows the resulting change for a variable retardation ranging from 0 to 360 degrees. Any point on the Poincare sphere can be reached by means of a retardation of 0 to 180 degrees by the first retardation plate and a retardation of 0 to 360 degrees by the second retardation plate. These two retardation plates can allow a fixed input polarization state to be transformed into any other output polarization state.

If the projection system introduces small changes to the polarization state, then it may not be necessary to have a PAD that can produce every possible polarization state. This can correspond to a smaller region on the surface of the Poincare sphere. In some implementations, using a smaller region can result in more accurate correction of the polarization due to the limited number of bits addressing the variable retardation plates.

While the present subject matter has been described in detail with respect to specific aspects, implementations, and features thereof, it will be appreciated that those skilled in the art, upon attaining an understanding of the foregoing, may readily produce alterations to, variations of, and equivalents to such aspects, implementations, and features. Accordingly, it should be understood that the present disclosure has been presented for purposes of example rather than limitation, and does not preclude inclusion of such modifications, variations and/or additions to the present subject matter as would be readily apparent to one of ordinary skill in the art.

Furthermore, numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

The system or systems discussed herein are not limited to any particular hardware architecture or configuration. A processor and memory can include any computing device that is a suitable arrangement of tangible components that provide a result conditioned on one or more inputs. Suitable computing devices include multipurpose microprocessor-based computer systems accessing stored software that programs or configures the computing system from a general-purpose computing apparatus to a specialized computing apparatus implementing one or more methods of the present subject matter. Any suitable programming, scripting, or other type of language or combinations of languages may be used to implement the teachings contained herein in software to be used in programming or configuring a computing device.

The methods disclosed herein (and variations thereof) may be performed in the operation of such computing devices. The order of the blocks presented in the examples above can be varied—for example, blocks can be re-ordered, combined, and/or broken into sub-blocks. Certain blocks or processes can be performed in parallel.

We claim:

1. An optical system comprising: an optical element configured to cause a polarization state distribution of light in the optical system to change from a predetermined polarization state distribution to a modified polarization state distribution of the light; and a polarization-altering optical device (PAD) configured to change the modified polarization state distribution of the light back to the predetermined polarization state distribution of the light spatially based on the modified polarization state distribution of the light caused by the optical element, wherein the optical system is configured to output the light having the predetermined polarization state distribution.

2. The optical system of claim 1, wherein the optical element comprises at least one of the following characteristics configured to change the polarization state distribution of the light in the optical system from the predetermined polarization state distribution:
a coating;
a reflective surface;
a birefringement material;
responding to stress by causing birefringence on the light;
responding to an electric field by causing birefringence on the light;
responding to a magnetic field by causing birefringence on the light; or
a direction selective absorption.

3. The optical system of claim 1, wherein the predetermined polarization state of output light is a uniform distribution.

4. The optical system of claim 1, further comprising:
a light source;
a spatial light modulator (SLM); and
a projection lens,
wherein the projection lens is configured to output the light having the predetermined polarization state distribution.

5. The optical system of claim 4, further comprising a cleanup polarizer positioned at the projector lens output, wherein the cleanup polarizer is configured to receive the predetermined polarization state distribution of light.

6. The optical system of claim 5, wherein the cleanup polarizer is configured to output a maximum amount of the light in response to the PAD altering the modified polarization state distribution of the light.

7. The optical system of claim 4, wherein the PAD is positioned between the SLM and the light source.

8. The optical system of claim 4, wherein the PAD is configured to change a global polarization state of the light.

9. The optical system of claim 4, wherein the SLM is a digital micromirror device.

10. The optical system of claim 4, wherein the SLM comprises a number of SLMs,
wherein the PAD comprises a number of PADs, the number of PADs being equal to the number of SLMs.

11. The optical system of claim 4, wherein the PAD is positioned between the SLM and the projection lens.

12. The optical system of claim 4, wherein the PAD is positioned at a conjugate plane to the SLM.

13. The optical system of claim 4, wherein the PAD is offset from a conjugate plane to the SLM.

14. The optical system of claim 4, wherein the PAD has a resolution that is lower than a resolution of the SLM.

15. The optical system of claim 4, wherein the light source comprises a laser.

16. The optical system of claim 4, wherein the optical system is a three-dimensional projection system configured for outputting three-dimensional images, the three-dimensional projection system comprising a polarization switch device.

17. The optical system of claim 4, wherein the optical system is a three-dimensional projection system having a first projection system configured for outputting left eye images and a second projection system configured for outputting right eye images.

18. The optical system of claim 4 wherein the PAD is configured to switch polarization of the light.

19. The optical system of claim 1, wherein the PAD comprises at least two spatially addressable variable retardation plates.

20. The optical system of claim 19, wherein the at least two spatially addressable variable retardation plates comprise at least two liquid crystal devices.

21. The optical system of claim 1, wherein the PAD is electronically addressable.

22. The optical system of claim 1, further comprising a control system configured for controlling the PAD, the control system comprising: a camera configured to measure a brightness of projected light onto a screen; a processor configured to execute an application to compute PAD retardation values for a PAD driver and to store the PAD retardation values in memory, wherein the PAD is configured to change the modified polarization state distribution of the light back to the predetermined polarization state distribution of the light spatially based on the modified polarization state distribution to reduce spatial changes caused by the optical element.

23. A projection system, comprising: a light source configured to provide light; a polarization-altering optical device (PAD) configured to change a polarization state distribution of the light spatially from a modified polarization state distribution of light back to a predetermined polarization state distribution of the light; a spatial light modulator (SLM) device configured to cause the polarization state distribution of the light to change from the predetermined polarization state distribution to the modified polarization state distribution of the light; a projection lens; and a cleanup polarizer positioned between the projection lens and a screen, wherein the projection lens is configured to receive light having the predetermined polarization state distribution as changed by the PAD from the modified polarization state distribution, wherein the cleanup polarizer is configured to receive the light from the projection lens and allow a maximum amount of polarized light to be outputted from the projection system.

24. The projection system of claim 23, wherein the cleanup polarizer is configured to allow a minimum amount of polarized light to be outputted from the projection system.

25. The projection system of claim 23, wherein the cleanup polarizer is configured to allow a predetermined amount of polarized light to be outputted from the projection system.

26. The projection system of claim 25, wherein the PAD is configured to allow a predetermined amount of polarized light to be outputted that varies spatially according to a resolution of the PAD and temporal and spatial transmission changes through the cleanup polarizer based on signal content for each region of the SLM device that corresponds to each pair of PAD pixels.

27. The projection system of claim 25, wherein the PAD is configured to allow a predetermined amount of polarized light to be outputted that varies spatially according to a resolution of the PAD, wherein transmission through the cleanup polarizer is configured to change spatially based on correcting color non-uniformity that originates in at least one of the projection system or a projector environment.

28. A method, comprising: receiving polarized light; changing, by an optical element, a polarization state distribution of the polarized light from a predetermined polarization state distribution to a modified polarization state distribution of the light; changing, by a polarization-altering optical device, the polarization state distribution of the polarized light spatially from the modified polarization state distribution back to the predetermined polarization state distribution, based on an amount of change to the polarization state distribution of the polarized light caused by the optical element; and outputting the polarized light having the predetermined polarization state distribution.

29. A method, comprising:
receiving a screen light brightness value corresponding to a retardation value of a polarization-altering optical device (PAD) pixel pair;
responsive to determining that an insufficient number of screen light brightness values are received, changing the retardation pair value for the PAD pixel pair and receiving an additional screen light brightness value corresponding to the changed retardation pair value of the PAD pixel pair;
responsive to determining that a sufficient number of screen light brightness values are received, determining a set of parameters using the screen light brightness value and retardation pair value; and
storing the set of parameters in memory.

30. A method, comprising:
receiving a screen light brightness value corresponding to a polarization-altering optical device (PAD) pixel pair;
responsive to determining that at least one of a maximum or a minimum screen light brightness level is not reached, changing PAD retardation pair values for the PAD pixel pair and receive an additional screen brightness value corresponding to the PAD pixel pair; and
responsive to determining that at least one of the maximum or the minimum screen light brightness level is reached, storing retardation pair values that correspond to the at least one of the maximum or the minimum screen light brightness level for the PAD pixel pair.

* * * * *